WILLIAM J. CARROLL.
Improvement in Excavators.
No. 115,700. Patented June 6, 1871.
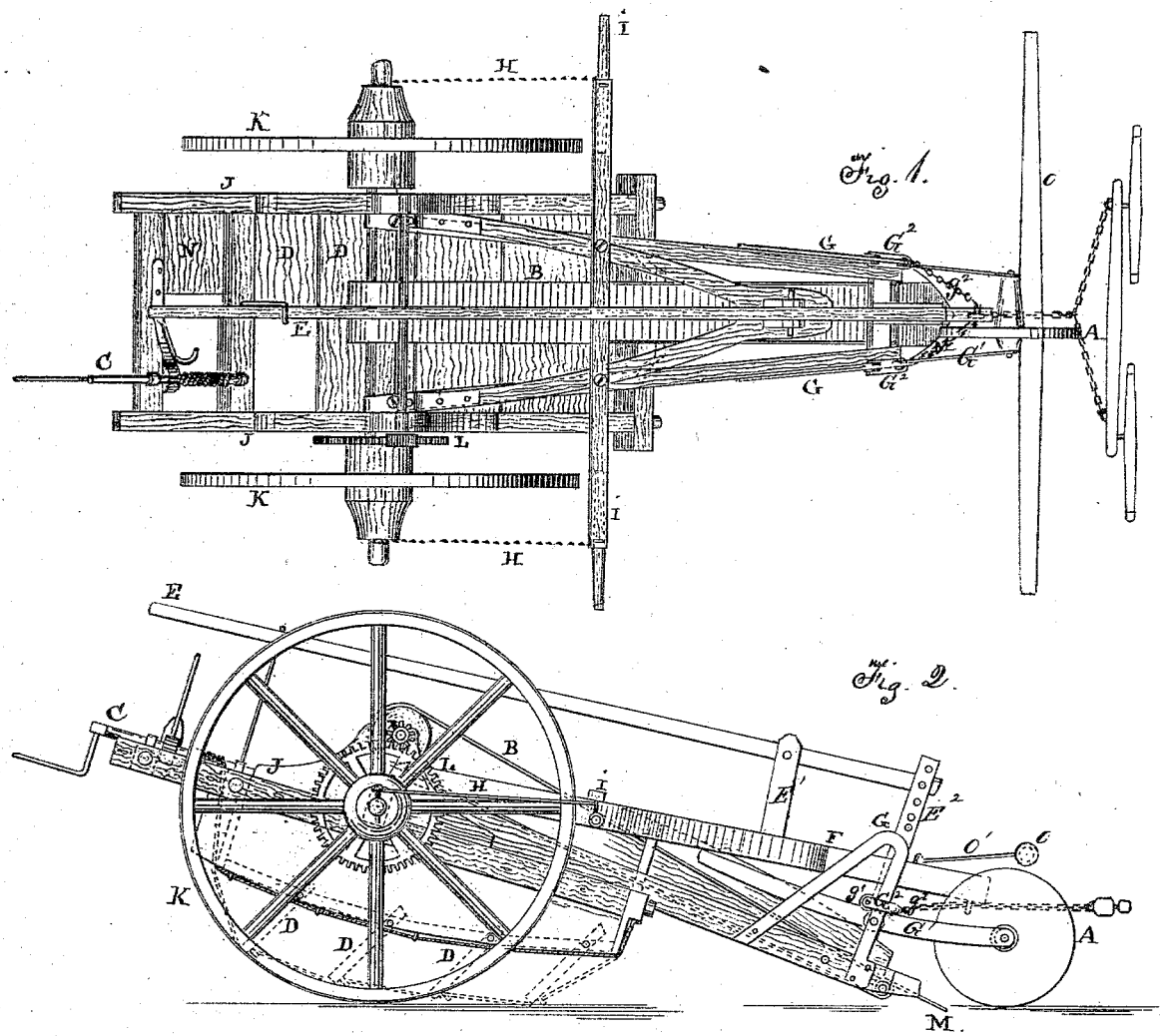

115,700

UNITED STATES PATENT OFFICE.

WILLIAM J. CARROLL, OF NATCHEZ, MISSISSIPPI.

IMPROVEMENT IN EXCAVATORS.

Specification forming part of Letters Patent No. 115,700, dated June 6, 1871.

*To all whom it may concern:*

Be it known that I, WILLIAM J. CARROLL, of Natchez, in the county of Adams and State of Mississippi, have invented certain Improvements in Excavators; and I do hereby declare that the following is a full, clear, and exact description thereof, reference being had to the annexed drawing making part of this specification, in which—

Figure 1 is a plan view of my improved excavator. Fig. 2 is a side elevation.

The same letters are used in both figures in the designation of identical parts.

This invention relates to machines for ditching, excavating, and grading purposes; and my improvement consists in the combination and arrangement of some of the parts of such a machine, as will be more specifically pointed out in the following description and claims.

To enable those skilled in the art to make and use my invention, I will proceed to describe its construction and operation.

The frame J of the machine, which is mounted upon the axle of the carrying-wheels K, is constructed with an extension inclining forward, which extension terminates in the ditching-plow M. The earth dug up by the plow is carried by the endless belt B, operated through suitable gearing from one of the carrying-wheels on the axle, up and discharged into a suitable box arranged under its rear end.

The preferred construction of this box and the means employed for emptying it are clearly shown in the drawing, and need no particular description, as they are well known and form no part of my invention.

The forward end of the machine is supported by the caster-wheel A, which runs on the ground in front of the plow, and is connected to the frame-work by means of two arms, $G^1$, which are pivoted at $g$ to standards G in the manner clearly shown in Fig. 2. The tongue F is attached by its hounds to the frame near the axle, extending forward to the caster-wheel. It is constructed with a rigid double-tree directly in front of the carrying-wheels K, extending with each end some distance beyond such wheels to enable it to serve as a guide for the chains H which pass through staples in its under side. The rear ends of these chains are fastened to the overhung ends of the axle and their forward ends to single-trees I, to which wheel-horses are hitched. The saddle of each horse must be provided with a stout ring-bolt to receive the ends of a bar, O, which is at its center attached by a chain, O', of suitable length, to the tongue, not far from its forward end, which is fastened to the hames of the horses by the ordinary straps. The front span of horses, if used, draws upon the standards G. Each of these standards, above the point where the arms of the caster-wheel are attached, is embraced by a clip, $G^2$, which carries at its rear end a roller, $g^1$, between its jaws, and has an eye at its front end for the attachment of a chain, $g^2$. The chain from each clip passes toward the point of the tongue, near which they unite in a single chain, and thus pass through a ring-bolt in the under side of the tongue forward of the caster-wheel, to be secured to the usual "stretcher" to which the leaders are hitched. The clips, capable of sliding up and down on the standards, will readily adjust themselves into line with the draft. The frame of the machine is oscillated on the axle, to raise or lower its forward end, by means of a long lever, E, which is fulcrumed in a post, $E^1$, erected upon the tongue. The outer end of the short arm of this lever is pivoted to a link or links, $E^2$, which are hinged at their lower ends to a stay-bolt connecting the standards G, and its long arm extends to within convenient reach of the driver sitting upon the seat N, a suitable detent being provided to hold the lever in any desired position.

By having the wheel-horses work upon each side of the carrying-belt, partly in rear of the plow, I am enabled to operate and turn around with this machine in an ordinary railroad cut, which it is impossible to do with the ordinary four-wheeled machines.

What I claim as my invention, and desire to secure by Letters Patent, is—

1. The combination of the tongue, rigid double-tree draft-chains H H, single-trees I I, and supporting-bar and chain O O', arranged with reference to one another and to the frame and carrying-belt, substantially as and for the purpose set forth.

2. The combination of the tongue F, supporting-bar and chain O O'; frame J, link $E^2$, and lever E, fulcrumed upon a post of the tongue, all arranged to operate substantially as set forth.

3. The combination of the frame, standards G, clips $G^2$ $g^1$, and chains $g^2$, substantially as set forth.

WILLIAM J. CARROLL.

Witnesses:
EDM. F. BROWN,
J. FRANKLIN REIGART.